United States Patent [19]

Scriver, Jr. et al.

[11] 4,192,366
[45] Mar. 11, 1980

[54] PNEUMATIC TIRE WITH MEDIUM VINYL POLYBUTADIENE/POLYISOPRENE BLEND TREAD

[75] Inventors: Richard M. Scriver, Jr., Atwater; Waldemar A. Ross, Bolivar, both of Ohio

[73] Assignee: The Goodyear Tire & Rubber Company, Akron, Ohio

[21] Appl. No.: 879,985

[22] Filed: Feb. 22, 1978

[51] Int. Cl.$^2$ .................. B60C 1/00; C08L 23/18
[52] U.S. Cl. .................. 152/209 R; 152/330 R; 152/357 A; 152/357 R; 152/374; 156/128 T; 260/5; 525/236
[58] Field of Search ............ 260/894, 5; 152/330 R, 152/357, 209 R

[56] References Cited

U.S. PATENT DOCUMENTS

| | | | |
|---|---|---|---|
| 3,827,991 | 8/1974 | Ando et al. | 260/894 |
| 3,919,024 | 11/1975 | Gordon | 152/330 R |
| 3,937,681 | 2/1976 | Nordsick | 526/21 |
| 3,978,165 | 8/1976 | Stumpe, Jr. et al. | 260/894 |

FOREIGN PATENT DOCUMENTS 1166832  10/1969  United Kingdom .............. 260/894

OTHER PUBLICATIONS

"Developments in New Aircraft Tire Tread Materials" Yager et al., Conference at Langley Research Center, Hampton, Va., Oct. 18-20, 1976, pp. 247-256.

*Primary Examiner*—J. Ziegler
*Attorney, Agent, or Firm*—H. C. Young, Jr.

[57] ABSTRACT

A pneumatic rubber tire having a tread comprised of a blend of cis-1,4 polyisoprene rubber and a medium vinyl polybutadiene rubber cured with an excess of sulfur. Said tire has been found to be useful as an aircraft tire having tread of enhanced durability.

3 Claims, 1 Drawing Figure

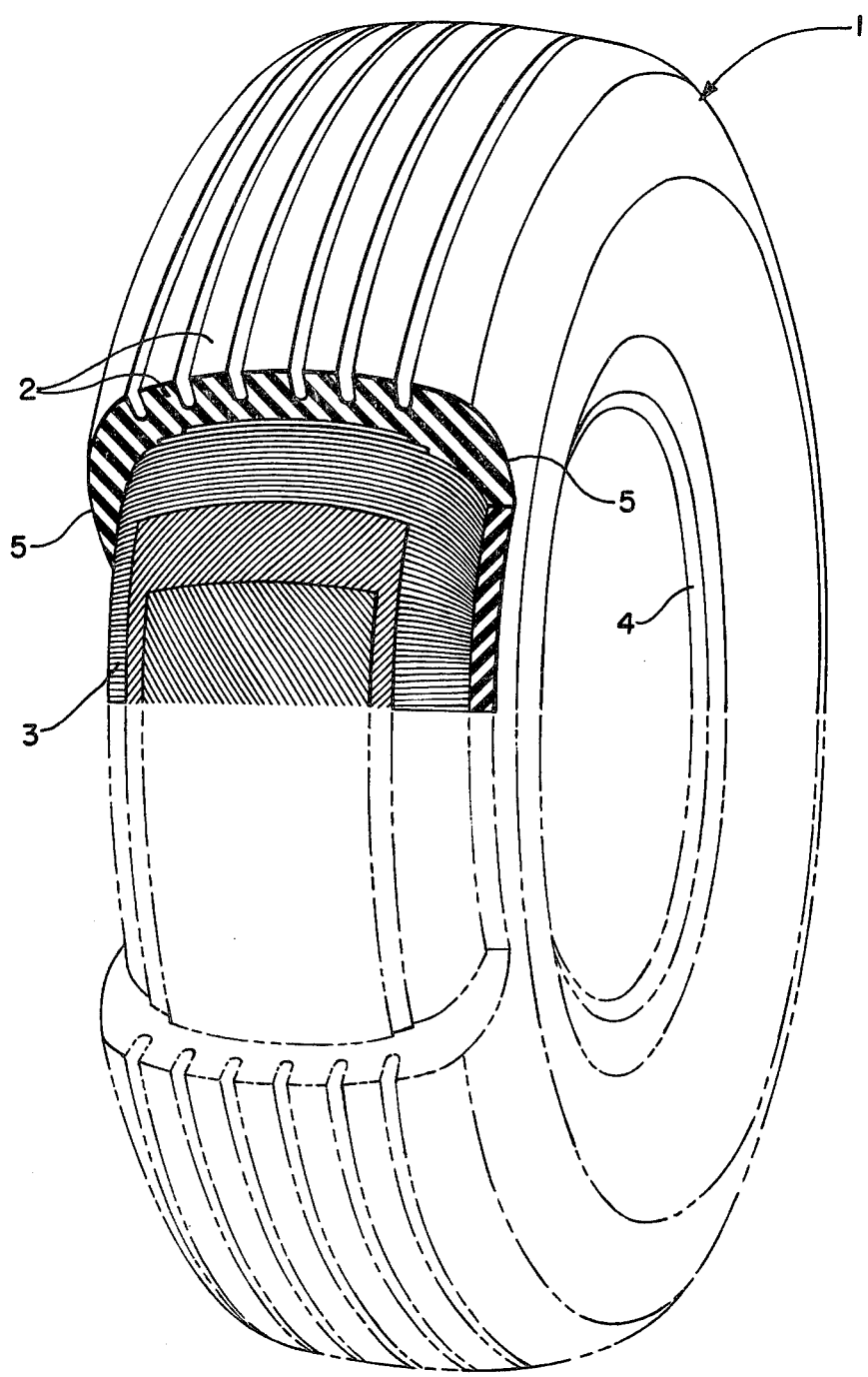

PNEUMATIC TIRE WITH MEDIUM VINYL POLYBUTADIENE/POLYISOPRENE BLEND TREAD

This invention relates to pneumatic tire treads and to elastomer blends useful therefor. The invention particularly relates to aircraft tires having such treads.

Pneumatic rubber tires are typically prepared with a ground contacting tread portion in which an integral, cooperative tread is used, having an elastomeric composition. The tread is subjected to the degrading effects of considerable flexing and abrasion as the tire is driven by a vehicle over various terrain features. Heat degradation of the tread also occurs due to internal heat build-up in the tire carcass and tread during use, particularly under heavy loads and rapid accelerations and decelerations. For conventional pneumatic tires, the elastomer is compounded, or blended, with various ingredients, including various other elastomers, to provide the necessary abrasion resistance, flex properties and heat durability, in order to achieve good treadwear in combination with durability and traction.

However, in the field of pneumatic aircraft tires, special situations exist which provide tread durability problems which are not heretofore solved by conventional pneumatic tire tread compositions.

The aircraft tire durability problem is dramatically observed in the situation where an aircraft has to accelerate on the ground, under load, to a high take-off speed to become airborne or where an airborne aircraft lands at a high speed, such as about 50 to about 150 miles per hour (mph), in which its wheels are immediately accelerated to the aircraft landing speed, under load, as it touches ground and lands. During these speed transition stages of the aircraft pneumatic tire upon acceleration or deceleration, particularly when carrying heavy loads, rapid heat build-up occurs in its tread portion, thereby promoting its rapid degradation, loss of internal adhesion, and decreasing its ability to withstand abrading.

Medium vinyl polybutadiene (polybutadiene containing a 1,2-structure) has been used along (U.S. Pat. No. 3,937,681) used as a blend with styrene/butadiene copolymers (British Pat. No. 1,166,832) or with natural rubber to enhance durability of pneumatic tire treads.

However, it is still desired to provide pneumatic tires, particularly aircraft tires, with a tread composition having an enhanced heat durability.

Therefore, it is an object of this invention to provide a pneumatic tire having a ground contacting tread portion with a good heat durability characteristic and to provide an appropriate elastomer blend. It is a further object of this invention to provide a pneumatic aircraft tire having enhanced tread heat durability characteristic while not substantially degrading its abradive durability, or tread life.

In accordance with this invention, it has now been discovered that a suitable ground contacting tread portion of a pneumatic tire, particularly an aircraft pneumatic tire, which is subject to rapid acceleration and/or deceleration in contact with the ground, particularly under loaded conditions, can be prepared from a suitably cured elastomer blend of a selected combination of elastomeric materials containing an increased sulfur curative content.

In accordance with this invention, a pneumatic rubber tire is provided which comprises a generally toroidal shaped carcass with an outer circumferential ground contacting tread, spaced beads and sidewalls extending radially from and connecting said tread to said beads, where said tread is a cured elastomeric composition comprised of, based on 100 parts by weight rubber, (A) 50 to about 80, preferably 55 to about 75, parts by weight cis 1,4-polyisoprene rubber and, correspondingly, (B) 50 to about 20, preferably 45 to about 25, parts by weight of a medium vinyl polybutadiene rubber having about a 30 to about 55, preferably about 35 to about 45, weight percent vinyl content, about 10 to about 40 weight cis 1,4-content and, correspondingly, 15 to about 55 weight percent trans 1,4-content; where said elastomer composition is cured with a sulfur content in the range of about 20 to about 50, preferably about 25 to about 40, weight percent more than required to maximize time to failure of the cured rubber composition according to blow-out test ASTM D-623, in which the medium vinyl polybutadiene has been replaced with high cis 1,4-polybutadiene rubber The cis-1,4-polyisoprene rubber which can be natural or synthetic rubber and cis 1,4-polybutadiene rubber typically have a cis 1,4-content of about 96 to about 99 weight percent.

The medium vinyl polybutadiene can be additionally described as containing about 30 to about 55 percent. monomer units in the 1,2-position, about 10 to about 40 percent monomer units of cis 1,4 carbon-to-carbon double bonds and about 15 to about 55 percent monomer units of trans-1,4 carbon-to-carbon double bonds and having a ML-4(100° C.) hardness in the range of about 40 to about 120.

The medium vinyl polybutadiene can be conveniently prepared by polymerizing 1,3-butadiene in an organic solvent with an organolithium compound as a catalyst with the addition of at least one polar modifier to enhance and increase its vinyl content. Generally, the temperature of the reaction can be in the range of about 30° C. to about 150° C. For further details concerning preparation of such a medium vinyl polybutadiene, reference can be made to U.S. Pat. No. 3,937,681 and to the patent references referred to therein.

It is an important feature of this invention that about 20 to about 50, preferably about 25 to about 40, percent by weight more sulfur is used as a curative than would conventionally be used for optimally curing the rubber blend if a high cis 1,4-polybutadiene were substituted for the medium vinyl polybutadiene. This generally translates to about 2 to about 2.4, preferably about 2.1 to about 2.3, phr sulfur (parts per 100 parts rubber, by weight).

It should be understood by one skilled in the art that said tread portion of the pneumatic tire as well as the rubber in the basic carcass containing reinforcing elements in the tread area, can be compounded by methods generally known in the rubber compounding art, such as mixing the various constituent rubbers in the recipe with various curing aids, such as accelerators, processing additives, such as oils, resins and plasticizers, fillers, pigments, antioxidants and antiozonants.

After mixing the ingredients and building the tire, the tire is typically cured at a temperature in the range of about 120° C. to about 165° C. for a period of about 10 to about 200 minutes, depending somewhat upon the tire size.

Further objects and advantages of this invention will be apparent by reference to the accompanying drawing which is a perspective view of an aircraft tire having a cut-away portion.

Referring to the drawing, the cured rubber aircraft tire 1 comprises the usual ground contacting tread portion 2, carcass containing the conventional reinforcing plies and inner air barrier 3, spaced bead portion 4 for securing the tire to a rim and connecting sidewalls 5.

In particular, the tread portion 2 is shown as having the composite required by this invention of the blend of medium vinyl polybutadiene and polyisoprene along with compounding agents.

The practice of this invention is further illustrated by reference to the following examples which are intended to be representative rather than restrictive of the scope of the invention. Unless otherwise indicated, all parts and percentages are by weight.

EXAMPLE 1

A. Test Sample Preparation

Samples of several rubber blend compositions for use in the tire treads were prepared and examined for heat durability and other properties. Such rubber blend compositions were prepared by mixing cis 1,4 polyisoprene natural rubber and medium vinyl polybutadiene rubber in a size No. 00, 1800–2500 gram capacity, Farrell-Birmingham laboratory mixer with processing oil, carbon black and other ingredients as shown in Table 1. Sulfur, and accelerators, were then similarly mixed into the rubber composition. The resulting compositions were then sheeted out from a mill and appropriate samples taken for various tests. The sheeted out composition was given an equivalent cure of 40 minutes at 135° C. before taking samples for varius tests.

Table 1

| Compound | Control[1] | Experiment[1] |
| --- | --- | --- |
| Natural rubber | 35.0 | 70.0 |
| cis-1,3-polyisoprene[2] | 35.0 | — |
| cis-1,4-polybutadiene[3] | 37.5 | — |
| Medium vinyl polybutadiene[4] | — | 41.3 |
| Resorcinol resin | 0.8 | 0.8 |
| Stearic acid | 2.5 | 2.5 |
| Antioxidants | 2.6 | 2.6 |
| Aromatic processing oil | 6.5 | 3.0 |
| Paraffinic wax | 0.7 | 0.7 |
| Carbon black, ISAF | 55.0 | 55.0 |
| Amine | 0.6 | 0.6 |
| Retarder | 0.5 | 0.5 |
| Accelerator | 0.9 | 0.9 |
| Zinc oxide | 5.0 | 5.0 |
| Sulfur | 1.6 | 2.1 |

[1]Parts are founded to nearest tenth.
[2]Has about a 98 percent cis-1,4-content obtained as Natsyn 200 from The Goodyear Tire & Rubber Company.
[3]Contains 7.5 parts typical aromatic rubber extending-typeoil containing about 70 percent aromatics, and is characterizedby having about a 96 percent cis 1,4-content.
[4]Contains 11.3 parts typical aromatic rubber-extendingtype processing oil containing about 70 percent aromatics. Polymer contains about 45 percent 1,2- or vinyl, 26 percent cis 1,4 and 31 percent trans-1,4 and was obtained as Intolene-50 from International Synthetic Rubber Ltd.

EXAMPLE 2

Various tests were made on samples taken in Example 1. Results are shown in the following Table 2 which especially illustrates the dramatic effect of enhanced heat durability of the natural rubber polyisoprene/medium vinyl polybutadiene blend, utilizing extra sulfur, as compared to polyisoprene/polybutadiene blend. This effect is particularly demonstrated by the values for percent rebound, internal friction, resilience, temperature rise (ASTM D-623) and blow-out time (ASTM D-623).

Table 2

| Test | Control | Experiment |
| --- | --- | --- |
| 300 % Modulus(MN/m$^2$)(ASTM #D-412) | 9.8 | 9.5 |
| Tensile(MN/m$^2$)(ASTM #D-412) | 22.0 | 22.8 |
| Elongation(%) (ASTM #D-412) | 530 | 570 |
| Rebound(%)(ASTM #D-1054) | 79.4 | 81.2 |
| Deflection(inches)(ASTM #D-1054) | 0.27 | 0.27 |
| Dynamic Modulus (E value)(kg/cm$^2$)[1] | 87.1 | 89.1 |
| Internal Friction(N value)(kilopoise)[1] | 28.0 | 21.1 |
| Resilience(R value)(%) | 46.1 | 56.1 |
| Hardness(ShoreA)(ASTM #D-2240) | 64 | 65 |
| Set(%) (ASTM #D-623) | 1.3 | 1.0 |
| Temperature Rise (°F./15 min.) (ASTM #D-623) | 53 | 45 |
| Blow-out test(time to failure) (min.) (ASTM #D-623) | 8 | 12.5 |
| Max. temp. at failure in blow-out test (ASTM #D-623) | 344 | 326 |

[1]Test described in Rubber and Vibration by S. D. Gehman,Rubber Chem. & Tech., Vol. 15 (1942) pp. 860–873.

EXAMPLE 3

A pneumatic rubber aircraft tire, of the type and size B24×9.5–10.5 was prepared having a tread of the rubber blend prepared according to Example 1 of cis-1,4 polyisoprene natural rubber and medium vinyl polybutadiene. The aircraft tire was satisfactorily field and laboratory tested.

The dynamic laboratory test involved 50 simulated aircraft take-offs, 100 simulated aircraft landings, and three 35,000 foot airplane taxis under load. For the simulated take-offs, the tire was required to accomplish a speed range of 0 to 200 miles per hour (mph) in 48.5 seconds while the applied load during this period ranged from 2,200 to 10,260 pounds. A 160 pound tire inflation was used. In the simulated landings test, the tire was required to undergo a speed change of 90 to 0 mph.

In the practice of this invention, the polymer blend-tread can be integral with and adhered to various tire carcass substrate rubber compositions. Typically, such a rubber composition is at least one of a butadiene/styrene copolymer rubber, cis 1,4 polyisoprene (natural or synthetic rubber) and 1,4 polybutadiene. Optionally, such a blend, particularly where the tread is in the region of the sidewall area of the tire may contain or be comprised of butyl rubber, halobutyl rubber, such as chlorobutyl or bromobutyl rubber, and an ethylene/propylene/conjugated diene terpolymer rubber.

In the further practice of this invention, the tread can typically be applied in the building of the green tire in which the uncured, shaped tread is built onto the cascass following which the green tire is shaped and cured.

Alternately, the tread can be applied to a cured tire carcass for which the previous tread has been buffed or abraded away as a retread.

In the tire treads of this example, the medium vinyl polybutadiene component was of the type prepared generally according to the hereinbefore description of this invention, although in its preparation it was preferred that it was reacted at a temperature in the range of about 30° C. to about 150° C. with the provision that the actual reaction itself was continued over a relatively more narrow temperature range of ±15° C. and even more preferably ±10° C.

While certain representative embodiments and details have been shown for the purpose of illustrating the invention, it will be apparent to those skilled in this art that various changes and modifications may be made therein without departing from the spirit or scope of the invention.

What is claimed is:

1. In a pneumatic rubber tire which comprises a generally toroidal shaped carcass with an outer circumferential ground contacting tread, spaced beads and sidewalls extending radially from and connecting said tread to said beads, where said tread is a cured elastomeric composition containing a medium vinyl polybutadiene, the improvement in which said tread is a cured elastomeric composition comprised of, based on 100 parts by weight rubber, (A) about 55 to about 75 parts by weight cis 1,4-polyisoprene rubber and correspondingly, (B) about 45 to about 25 parts by weight of a medium vinyl polybutadiene rubber having about a 35 to about 45 weight percent vinyl content (1,2-content) about 10 to about 40 weight percent cis 1,4-content and, correspondingly, 15 to about 55 weight percent trans 1,4 content and having a ML (100° C.) hardness in the range of about 40 to about 120, in which said elastomer composition is cured with a sulfur content in the range of about 2 to about 2.4 phr in an amount equivalent to about 25 to about 40 weight percent more than the sulfur content which would be required according to the test of maximizing the time to failure of the cured rubber composition according to blow-out test ASTM D-623, in which only for the purpose of said test, the medium vinyl polybutadiene is replaced with high cis 1,4-polybutadiene rubber.

2. The pneumatic rubber tire of claim 1 where the medium vinyl polybutadiene is of the type prepared by polymerizing 1,3-butadiene in an organic solvent with an organolithium compound as a catalyst with the addition of at least one polar modifier to enhance and increase its vinyl content at a temperature in the range of about 30° C. to about 150° C. with the actual polymerization temperature maintained in the range of about +15° C.

3. The pneumatic rubber of claim 1 where said cis 1,4-polyisoprene rubber and said cis 1,4-polybutadiene rubber have a cis 1,4-content of about 96 to about 99 weight percent of their structure.

* * * * *